United States Patent
Fischer et al.

(10) Patent No.: US 8,795,038 B2
(45) Date of Patent: Aug. 5, 2014

(54) SUSPENSION APPARATUS AND METHOD FOR SUSPENDING SAUSAGES, IN PARTICULAR SAUSAGE CHAINS

(71) Applicant: Albert Handtmann Maschinenfabrik GmbH & Co. KG, Biberach (DE)

(72) Inventors: Thomas Fischer, Gutenzell (DE); Florian Osswald, Ulm (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 0 days.

(21) Appl. No.: 13/950,330

(22) Filed: Jul. 25, 2013

(65) Prior Publication Data

US 2014/0073231 A1     Mar. 13, 2014

(30) Foreign Application Priority Data

Sep. 7, 2012   (EP) .................................... 12006317

(51) Int. Cl.
   *A22C 11/00*   (2006.01)

(52) U.S. Cl.
   USPC .......................................................... 452/51

(58) Field of Classification Search
   USPC ........... 452/30–35, 37, 46–48, 51; 198/460.1, 198/678.1, 683, 465.4, 418.7, 418.8
   See application file for complete search history.

(56) References Cited

U.S. PATENT DOCUMENTS

| | | | | |
|---|---|---|---|---|
| 5,058,750 A * | 10/1991 | Gr se | ............................ | 209/583 |
| 5,964,354 A * | 10/1999 | Skinner | ......................... | 209/3.3 |
| 6,290,591 B1 * | 9/2001 | Hergott et al. | ................... | 452/51 |
| 6,523,462 B1 * | 2/2003 | Johnson et al. | ............. | 99/443 C |
| 6,675,066 B2 * | 1/2004 | Moshgbar | ...................... | 700/229 |
| 6,912,434 B2 * | 6/2005 | van den Nieuwelaar et al. | ............................. | 700/116 |
| 6,971,501 B2 * | 12/2005 | Beyer | ......................... | 198/459.3 |
| 7,614,942 B2 * | 11/2009 | Liermann et al. | ............. | 452/186 |
| 7,735,630 B2 * | 6/2010 | Borkiewicz et al. | ........ | 198/465.4 |
| 8,151,973 B2 * | 4/2012 | Borkiewicz et al. | ........ | 198/465.4 |
| 8,342,318 B2 * | 1/2013 | Knodel | .......................... | 198/683 |
| 2010/0243409 A1 | 9/2010 | Borkiewicz et al. | | |

FOREIGN PATENT DOCUMENTS

DE   102005051404 A1   4/2007
EP      1847178 A1   10/2007

OTHER PUBLICATIONS

Search Report for European Application No. 12 00 6317.7, dated Feb. 13, 2013.

* cited by examiner

*Primary Examiner* — Richard Price, Jr.

(74) *Attorney, Agent, or Firm* — Marshall, Gerstein & Borun LLP

(57) ABSTRACT

A suspension apparatus and a method for suspending sausages, in particular sausage chains, including a plurality of circulating suspension hooks, where the suspension apparatus is configured such that it is able to accommodate a plurality of groups of sausages, the respective sausages being suspended from n suspension hooks. The apparatus includes at least one variable indicator capable of indicating a group end and/or a group beginning.

26 Claims, 13 Drawing Sheets

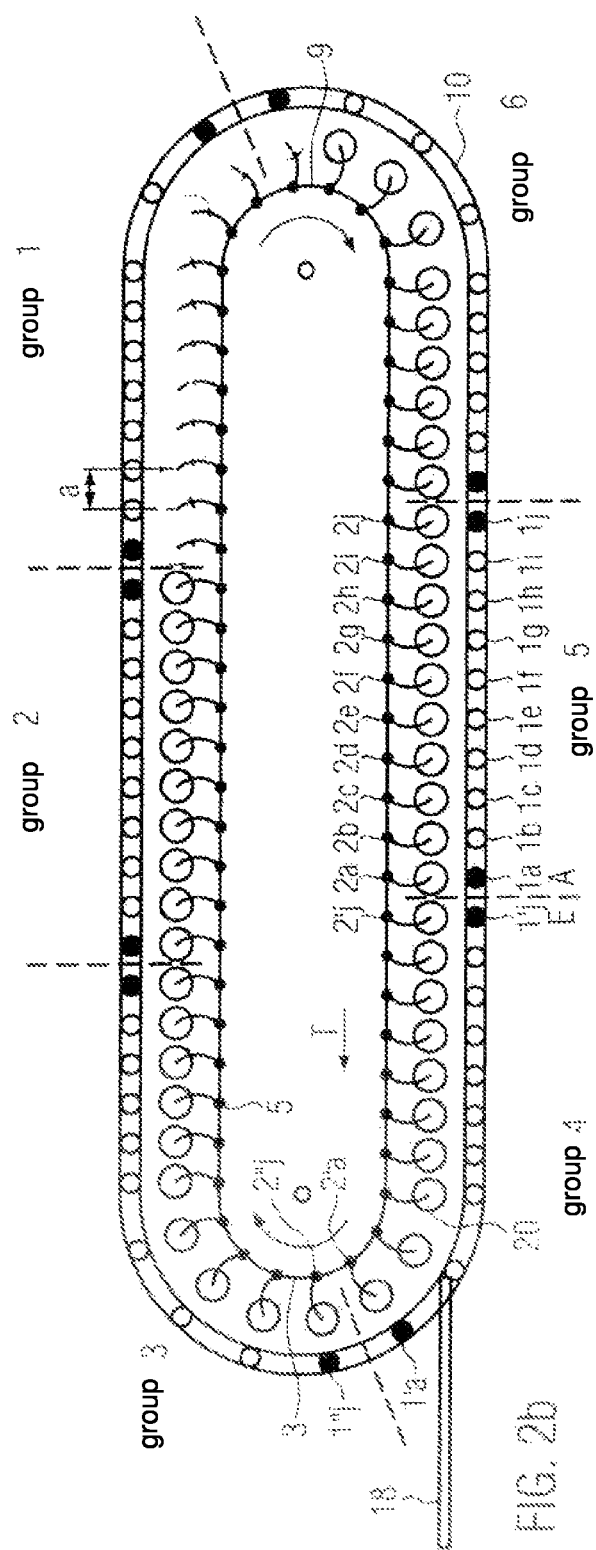

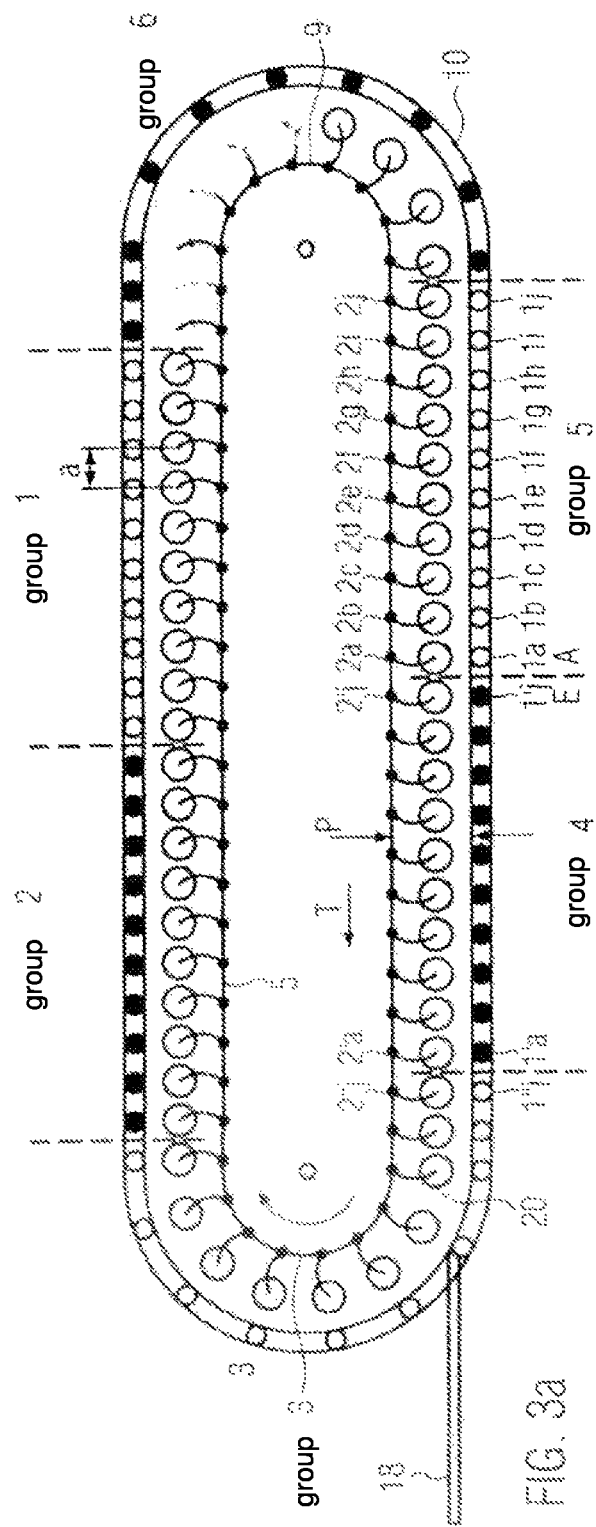

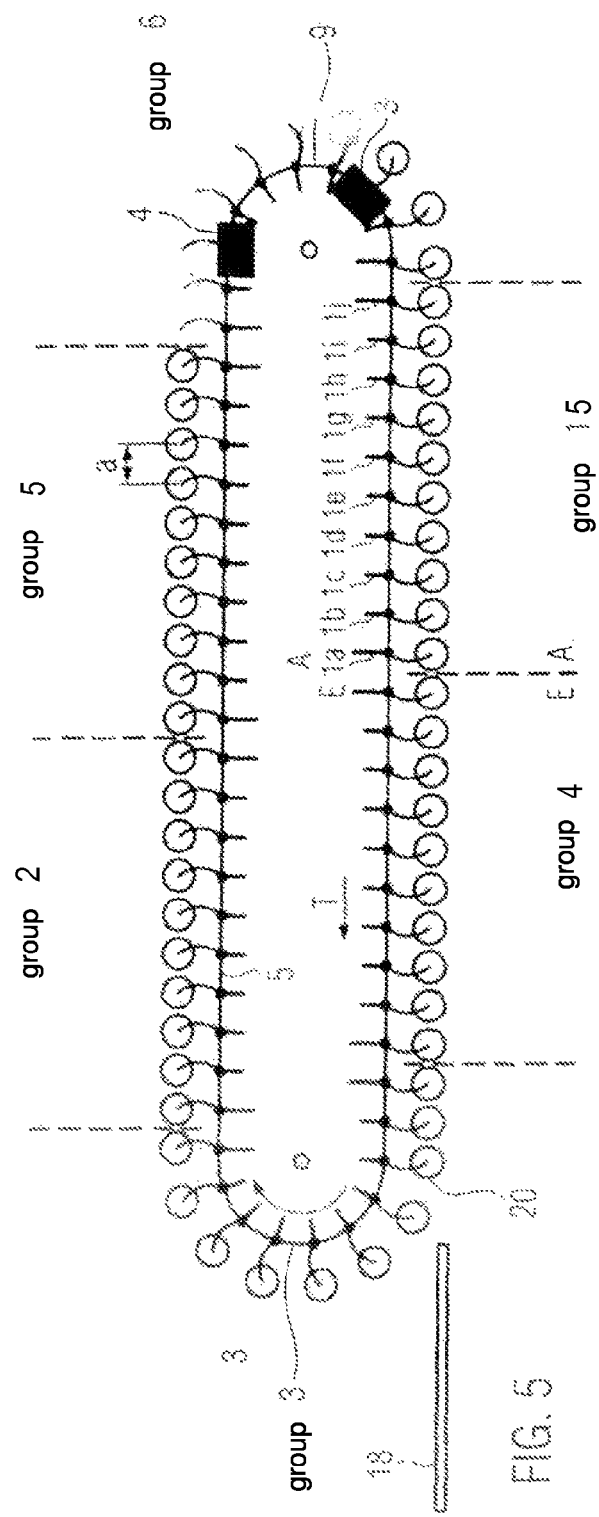

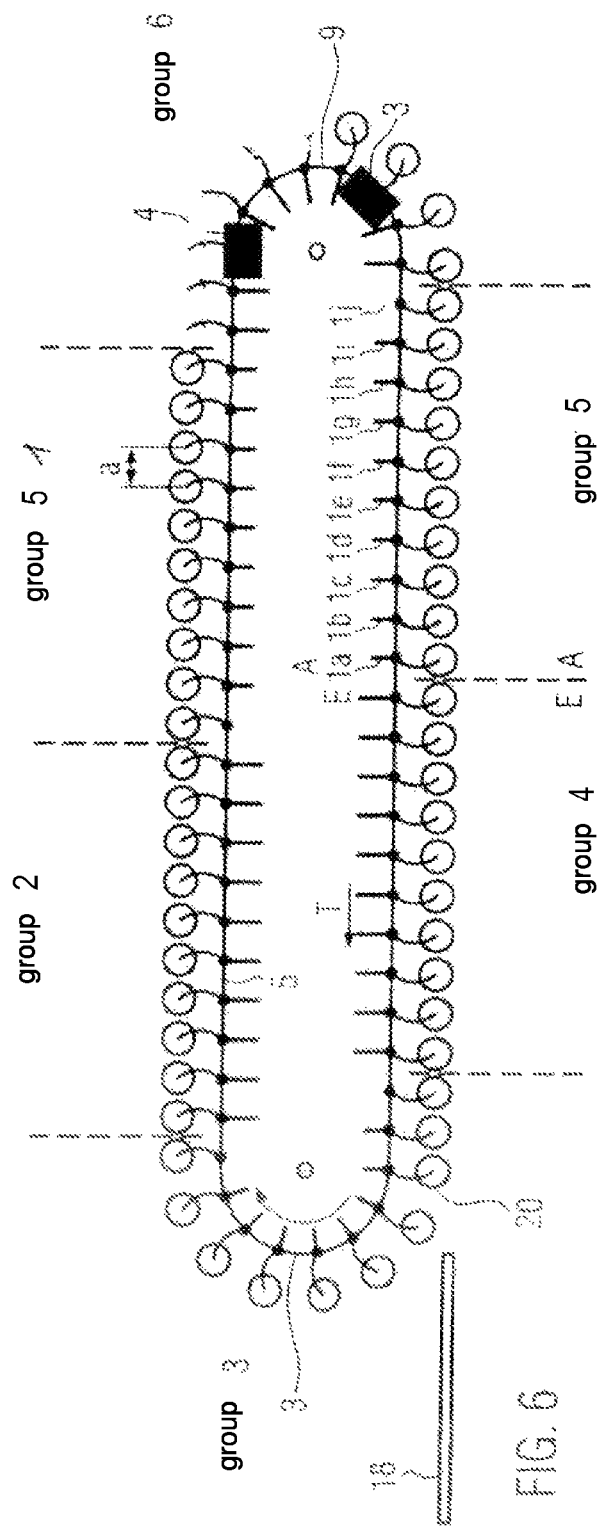

SUSPENSION APPARATUS AND METHOD FOR SUSPENDING SAUSAGES, IN PARTICULAR SAUSAGE CHAINS

CROSS-REFERENCE TO RELATED APPLICATION

The present application claims the benefit of priority of European Application No. 12 006 317.7, filed Sep. 7, 2012. The entire text of the priority application is incorporated herein by reference in its entirety.

BACKGROUND

The disclosure relates to suspension apparatus and method, with suspension hooks, such as used in sausage production operations.

FIELD OF THE DISCLOSURE

In sausage production processes the products are produced as a continuous chain (individual sausages in series which are interconnected at the respective points of division) and, after having been stuffed and twisted off, they are transferred to a suspension apparatus. There, they are taken up in the form of loops or chains by suspension hooks. It is, however, also possible to form a loop on the individual sausage portions by means of a loop former, said loop being then used for suspending one or a plurality of sausages from suspension hooks of a suspender. Finally, also two or more sausages may be suspended from a hook at a point of division between two portions. The suspension hooks are mounted on the suspension apparatus such that they circulate thereon. The distances between the hooks are mechanically adjustable, either stepwise (e.g. in a 5 mm raster) or continuously, and can thus be adapted to different requirements such as diameter of the sausages, number of sausages per smoke bar etc.

In practice, there are different variants of charging the suspension apparatus with hooks:

The length of the sausage casings used may e.g. be adapted such that the sausage chain produced fits precisely onto a smoke bar. In this case it will make sense to charge the suspension apparatus in groups, e.g. 4 groups comprising each 20 hooks. This corresponds approximately to one smoke bar length. The respective hook groups can then be spaced apart at a distance which is larger than the distance of the respective hooks within a group, so that the sausages or sausage chains can easily be removed from the hook by means of a smoke bar.

If, however, sausage casings are used whose length is not adapted to the smoke bar length, the suspension apparatus will normally be charged uniformly with hooks over its whole circumference, i.e. e.g. over its whole belt length. This kind of charging is primarily used in the processing of natural sausage casings. The suspension apparatus is here fully charged and all hooks are normally spaced apart at identical distances. In view of the different lengths of the natural sausage casings, groups of different lengths are obtained. However, a smoke bar can accommodate thereon only a certain number of sausage loops. Prior to removing the sausage loops, the operator thus has to cut the sausage chain strand at the point defining the end of the group for the respective smoke bar length. It may also be necessary to close the sausage ends (by knotting, fastening with clips, welding) at the point of division. In view of the predetermined constant distance between the individual hooks, it may be difficult to rapidly find the right point of division.

This problem has hitherto been coped with in different ways.

Variant 1:

The operator counts the hooks or the number of loops and cuts the sausage chain through when the desired number of loops has been reached. This is troublesome and requires high concentration. Mistakes may easily be made.

Variant 2:

During production an empty hook may, to make things easier, overrun the transfer position, i.e. not be loaded, so that an empty position is created. This empty running must, however, take place at a higher speed, and the higher acceleration required for this purpose may have a negative effect on the portions that have already been suspended. This dynamic also has a negative influence on the taking up of the sausage loops and the sequence of operations carried out by the operator for closing the group ends.

Variant 3:

According to another variant, hooks having different colors are used for identifying the group end. This solution is, however, not very flexible. A product change to different sausage sizes or group sizes necessitates laborious recharging of the hooks.

Hence, all the hitherto commercially available suspension apparatuses fail to offer the possibility of carrying out a rapid and simple changeover, if the demands to be satisfied should change, and of allowing the operator to discern a group end rapidly and easily so that e.g. a continuous sausage chain can be cut through at the group end or a smoke bar can precisely be inserted into a group so as to remove a respective group having a specific size.

SUMMARY OF THE DISCLOSURE

Starting from the above, it is one aspect of the present disclosure to provide an apparatus and a method allowing the end and/or the beginning of a sausage group to be easily discerned so as to localize a predetermined separation position or removal position between two sausage groups.

According to the present disclosure, the suspension apparatus for suspending sausages, i.e. sausage loops and in particular sausage chains, comprises a plurality of suspension hooks. The suspension apparatus is able to accommodate a plurality of groups of sausages, the respective sausages of a group being adapted to be suspended from n suspension hooks (2) (n∈IN). The suspension apparatus includes at least one variable indicator capable of indicating a group end and/or a group beginning. This indicator is provided in addition to the hooks. With the aid of this indicator, the operator is able to discern precisely where the sausage chain has to be cut through and/or where the smoke bar has to be threaded in or removed from the sausages so as to remove a group having a specific size. Reliable and precise operation is thus guaranteed. The indicator allows continuous operation without any necessity of stopping the hook movement for cutting the strand through or for removing the group in question. Since indication takes place during the movement of the sausage group, the operator is not compelled to cut the sausage strand through at a specific location and at a precise moment in time, but he can do so within a larger time window and this will improve working conditions. The variable indicator can be adapted to different production conditions. When the caliber and consequently the number of suspension hooks per group is changed, the variable indicator can be adapted and can then correctly indicate, without any changeover being necessary, the beginning and/or the end of a group comprising a changed number of hooks. In this context, variable means that the state of the indicator can change such that an operator will be able to optically discern at least two different states so as to judge whether or not a group beginning and/or a group end is present. The state can be changed during operation of the suspension apparatus, i.e. during production.

This solution will be particularly advantageous when the distances between the suspension hooks are constant, and when the suspension hooks are driven e.g. via a circulating driving element, such as a belt or a chain. The operator can thus easily orient himself without having to count the hooks. The indicator can then be adapted to the smoke bar length during production.

According to an advantageous embodiment, the suspension apparatus includes an adjustment device through which the state of the indicator can be changed, e.g. mechanically or by switching, e.g. by switching a light source or LED on and off.

In order to be able to discern a group end and/or a group beginning of a subsequent group, the state of the indicator can be changed between a first state corresponding to a group beginning and/or a group end of the suspension hooks and a second state, which does not correspond to any beginning or end of a group. The operator is thus easily able to discern that the sausage strand has to be cut through e.g. after a specific indication or mark or before a specific indication or mark or between two indications or marks.

The state may, however, also be variable between a first state indicating the suspension hooks of a first group and a second state indicating the suspension hooks of a subsequent (or leading) second group. This means that the operator will clearly see when the end of a group has been reached, since the hooks and sausage loops, respectively, of the following group have a modified indicator.

According to an advantageous embodiment, the suspension apparatus includes a control unit into which the specific number of suspension hooks per group can be inputted, with the control unit controlling the adjustment device. This kind of control allows an automatic operation of the suspension apparatus and an adequate adaption of the indicators also during production.

According to an advantageous embodiment, each indicator is configured as a component which is arranged on a hook and which is variable as regards its position and/or color. Due to the fact that the indicator is secured to the hook, it can move together with said hook in the conveying direction, so that the indication of the group end and/or the group beginning moves synchronously together with the sausages so as to allow a very precise detection of the group end in a time independent manner. Due to the change in color or position, the operator will easily be able to discern the different states of the indicator. The change in position of the indicators may for example be accomplished mechanically, e.g. in that the indicators are rotated, lifted, tilted etc., so that the difference will easily be discernible to the operator. It is also possible to use light sources, in particular LEDs, which can be modified by switching them on and off or which light up in different colors.

The component which is adapted to undergo a change of position may e.g. be a locking bolt, which can be moved either to an upper or to a lower position by pressing its operating button. The operator is able to discern whether the locking bolt is in a first state, i.e. in a raised position, or in a second state, i.e. in a lower position. The indicator may for example also be a rotatably supported component having different colors on the circumference thereof, e.g. on the front and on the back. By rotating the component through a specific angle, e.g. 180°, a first color can be discerned in a first state, whereas in a second state the operator will discern a different color. In addition, components may be used, which have a geometrical shape whose front view changes between a first state and a second state when the component is rotated about a shaft through a specific angle. This kind of component may e.g. be a three-sided prism, preferably a regular three-sided isosceles prism, the parts discerned being either the edge of the prism or the side face of the prism. These are, however, only a few possible examples.

According to another embodiment, the indicator may include a light source, in particular an LED. Due to the fact that the light source is switched on and off, the operator will easily be able to differentiate between the first state (e.g. radiating light source) and a second state (deactivated light source). It would be possible that also the light sources are arranged on the hooks and move together therewith and are supplied with current via sliding contacts. Also the control may then be effected via sliding contacts or via radio signals.

According to a particularly advantageous embodiment, a plurality of light sources, in particular a plurality of LEDs, may however be arranged on a light bar. This light bar is at least partially, i.e. section wise, arranged at the circulation path of the hooks, so that the light sources can be associated with specific hooks or hook positions. If there is only one operator, it may suffice to provide the light bar on only one side of the suspension apparatus. If the light bar is also provided on the back of the suspension apparatus, work can also be done in this area. In this case, the sausage chains can also there be cut through and/or the sausage chains or sausages can be removed from the hooks. The light bar may also be provided in the form of a closed light bar. The individual light sources or LEDs can be controlled individually and switched on and off via the adjustment device, e.g. a switch. A control unit controls the adjustment device such that the group beginning and/or the group end is indicated by one or a plurality of light sources, in particular LEDs, lighting up in the conveying direction of the suspension hooks together with the movement of the hooks. As described above, the indicators, which are arranged on the hooks, can move together with the hooks in the conveying direction T. The light sources of the light bar or light chaser bar, which are fixedly arranged, can be controlled such that the indication moves synchronously together with the conveying movement of the sausage chains, i.e. accompanies it. Hence, operated together with the movement of the sausage chains means here that the light sources are controlled depending on the position of the group end and/or group beginning. The bar itself need therefore not be moved.

Preferably, the light bar includes a transparent protective cover, in particular a cover made of silicone, e.g. a silicone tube. The light bar is thus sufficiently protected against moisture and dirt. This kind of light bar is also easy to clean, a property which is extremely important in the food producing sphere for hygienic reasons.

According to an advantageous embodiment, the light bar comprises multi-colored light sources. The light sources used may either the individual light sources, which are able to emit light of different wavelengths, i.e. different colors, or light sources having a first color are arranged side-by-side and light sources having a second color are arranged below the first-color light sources or adjacent thereto.

Irrespectively of the above shown detail solutions, it is important that the indicated group end and/or the indicated group beginning moves synchronously together with the movement of the suspension hooks in the conveying direction T. As has already been described, this can, on the one hand, be accomplished in that the indicators are fixed to hooks. The indicator can thus change its indicating state on the one hand, and, on the other hand, it can also change its position, viz. in accordance with the movement of the hooks. Also a systematic control of the light sources in a light bar allows the same effect, viz. that the light sources arranged one after the other in the conveying direction can be controlled such that the position of the group end and/or group beginning, indicated through illumination or non-illumination, moves together with the movement of the suspension hooks in the conveying direction. The state of the juxtaposed light sources changes in response to the respective current position of the group end and/or the group beginning.

In accordance with the method according to the present disclosure, the end and/or the beginning of a respective sausage group is indicated via a variable indicator. Indication of the group end and/or the group beginning takes place synchronously with the movement of the suspension hooks in the conveying direction. In particular, the group end and/or the group beginning is indicated by one or a plurality of light sources, in particular LEDs, arranged on a light bar and operated in the conveying direction together with the movement of the hooks.

In accordance with the method according to the present disclosure, the sausage chain suspended from the suspension hooks can then be cut through upstream of the indicated group end and/or downstream of the indicated beginning of the subsequent group, when seen in the conveying direction, and/or a smoke bar for removing the subsequent group can be inserted at the indicated point. Correct operation can be guaranteed in this way.

BRIEF DESCRIPTION OF THE DRAWINGS

FIG. 2b shows the apparatus according to FIG. 2a at a second moment in time.

FIG. 3a shows in a highly schematic representation a top view of a second variant of the first embodiment at a first moment in time.

FIG. 5 shows a schematic representation of a top view of a first operating variant of a second embodiment according to the present disclosure.

FIG. 6 shows schematically a top view of a second operating variant of a second embodiment according to the present disclosure.

FIG. 11a shows a top view of the prism according to FIG. 10a.

FIG. 13a shows a top view of the indicator according to FIG. 12a.

DETAILED DESCRIPTION OF THE PREFERRED EMBODIMENT

Figure 1:
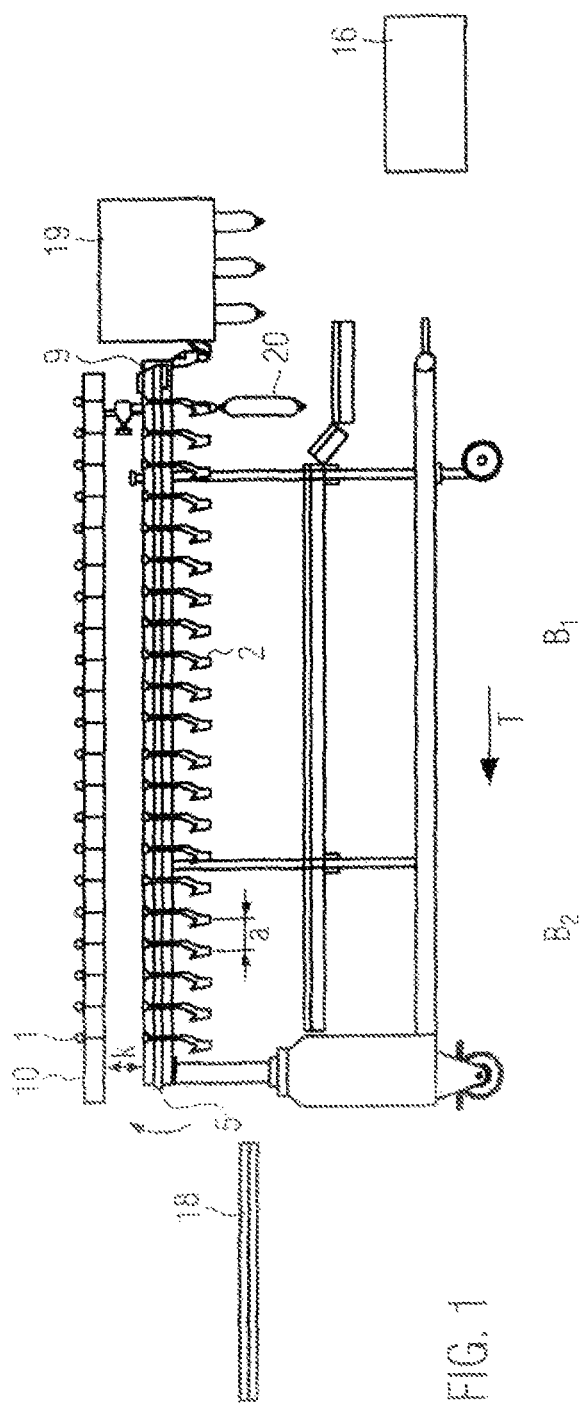
FIG. 1 shows a side view of a first embodiment according to the present disclosure.

As can be seen from FIG. 1, the suspension apparatus comprises a plurality of suspension hooks 2 circulating on a closed circulation path. The suspension hooks are preferably arranged parallel to one another and the circulation path extends substantially horizontally.

Figure 4C:
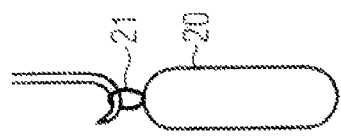
FIG. 4c shows a schematic representation of a single sausage on a loop.

The suspension hooks 2 serve to take up sausages or sausage loops in the area of a transfer position 9 and to convey them in the conveying direction T, i.e. in the direction of circulation of the hooks, into removal areas B1 to B4 provided. The removal area is the area in which the suspension hooks are arranged for removing therefrom the sausages, e.g. by means of a smoke bar 18. One removal area B1 may be provided. Likewise, a plurality of removal areas on the front and/or on the back (cf. e.g. also FIG. 2a) may be provided. The sausages are suspended from the hooks in sausage loops. A sausage loop may here either be a loop 21 that has been attached to a sausage or a plurality of sausages by a loop former (FIG. 4c), or loops defined by sausage chains provided in the form of a loop (individual sausages in series, interconnected at respective twist-off points) (cf. also FIG. 4a). It is also possible to suspend at least two sausages 20 from the suspension hook 2 at their point of division or twist-off point.

Figure 4B:
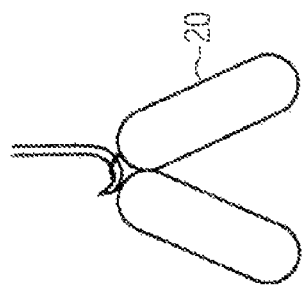
FIG. 4b shows sausages taken up on a hook at a division point.
Figure 4A:
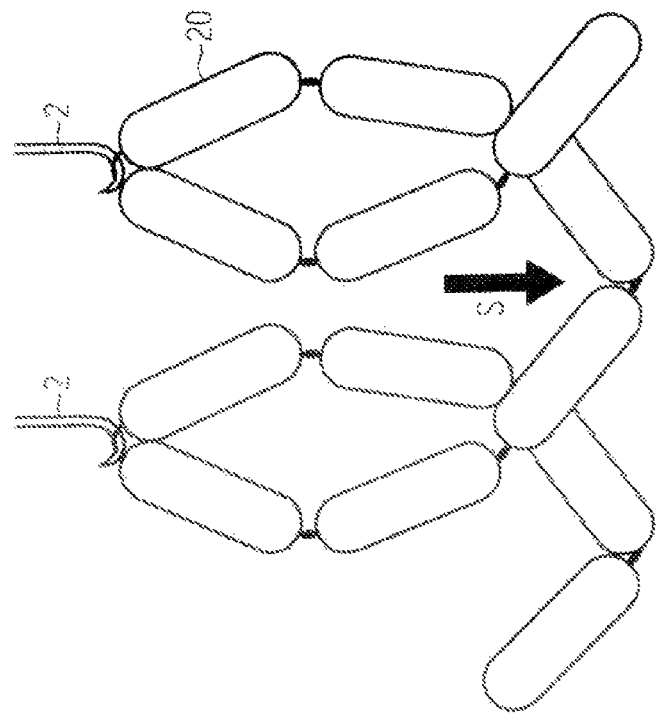
FIG. 4a shows a sausage chain suspended in the form of loops.
Figure 7D:
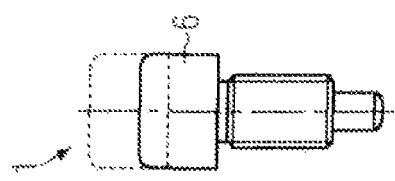
FIG. 7a-d show different states of a locking bolt in a side view.
Figure 7C:
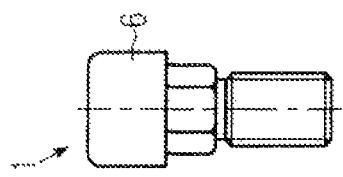
Figure 7B:
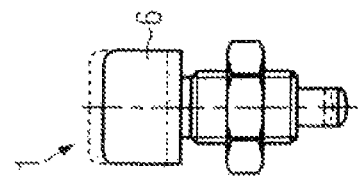
Figure 7A:
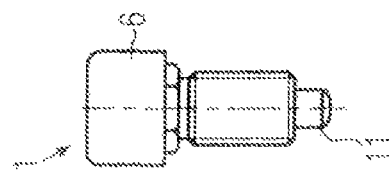

The present disclosure is particularly suitable for sausage chains of the type shown in FIG. 4a, which, as indicated by arrow S, have to be cut through at the end of a sausage group by an operator with the aid of a cutting unit before they are removed via a smoke bar 18. The present disclosure is, however, also suitable for mere removal by means of a smoke bar and for detecting the end of a sausage group in the case of a suspension of the type shown in FIG. 4b and FIG. 4c.

In the front area of the suspension apparatus 100, a suspension hook 2 threads into the sausage loop at the transfer position 9, said sausage loop coming from a stuffing machine and being fed by a conveyor unit 19 with a transfer device, removes the sausage loop and carries it on in a conveying direction T. Transfer and conveyor units of the type in question are known and will here not be explained in detail, consequently. The suspension apparatus shown in FIG. 1 includes wheels and is therefore mobile and can be moved such that the front end thereof will precisely be located at a take-up position 9.

The suspension hooks 2 are here arranged on a circulating driving element 5, provided e.g. in the form of a driving belt or a driving chain which are adapted to be driven by a motor. The suspension hooks 2 are preferably spaced apart at a constant distance a. The distance a may be adjusted e.g. in a mechanically set raster, or continuously.

The sausages or sausage loops are removed from the suspension apparatus 100 by inserting a smoke bar 18 into the sausage loop, in particular into the sausage chain, and by raising it subsequently. Depending on the caliber of the sausages produced and depending also on the smoke bar length, only a certain number of sausage loops or sausage chains can be accommodated on a smoke bar, said number corresponding to a specific number of hooks 2 from which these sausage loops or sausage chains are suspended, since also the distance a is caliber dependent. If sausage casings are used whose length is not adapted to the smoke bar length, the suspension apparatus will normally be charged with hooks over its whole circumference (a=const). This kind of charging is primarily used in the processing of natural sausage casings.

In order to enable the operator to discern the group length, or the beginning and the end of the group, at least one variable indicator 1 is provided according to the present disclosure. This is particularly important, since especially prior to removing the sausage loops with the smoke bar, the operator will have to cut the strand at the point representing the end of the group for the smoke bar length. At the separation point it may additionally be necessary to close the sausage ends (by knotting, fastening with clips, welding, etc.). According to the present disclosure, the operator will be able to rapidly find the separation point, although the hooks 2 are equally spaced apart at a distance a.

According to this embodiment, a light source, in particular an LED, is provided as a variable indicator 1. This variable indicator can be controlled and switched on and off via a control unit 16 and an adjustment device 3 in the form of a switching unit. According to this embodiment, the suspension apparatus 100 includes a light bar or a light chaser bar 10 comprising a plurality of light sources successively arranged in the conveying direction of the hooks 2 such that they can be controlled separately from one another. As can be seen in FIG. 2-3, the light bar can be arranged on the circulation path of the suspension hooks 2 such that it extends along said circulation path in full length or at least along certain sections thereof. In the figures, the light bar is arranged such that it extends along the whole length of the circulation path. However, depending on the respective use of the suspension apparatus, the light bar may also be arranged only section wise, e.g. only in the front area and/or only in the rear area. As can be seen from FIG. 1, the light bar may be arranged above the circulating suspension hooks 2. This is advantageous insofar as collisions with comparatively long sausages to be conveyed will be avoided. It will be important to arrange the light chaser bar as closely as possible to the suspension hooks, since the group end and/or the group beginning can then be discerned more easily and more clearly. If the light chaser bar 10 is, however, not positioned high enough, the smoke bar loaded with sausages will collide therewith during removal from the hooks. The light chaser bar is arranged on a level which is k=1 to 15 cm higher than the upper end of the circulating driving unit 5 (cf. FIG. 1). The distance p (cf. e.g. FIG. 2$a$) in a horizontal direction between the circulating driving unit 5 and the light chaser bar lies within a range of approx. 0 cm up to and down to ±15 cm, i.e. the light chaser bar may be arranged inside or outside the driving unit.

The distance between two successive light sources lies in a range of approx. 5 mm to 40 mm. The distance a between two neighboring hooks is adjustable within a range of 20 mm to 150 mm. Each light source, i.e. here each LED, is addressable individually via a signal, e.g. an SPI signal. Arbitrary light scenarios can thus be established as a function of time and in this case in particular depending on the position of the end or of the beginning of a group. Since, as has been described above, the light source and LED raster dimensions are very small, the light sources may e.g. be activated such that the distance between two successive activated light sources corresponds approximately to the distance a between the hooks. The operator can thus easily follow the hook movement. A solution along these lines entails the advantage that, if the hook distance a should change, also the distance between successive light sources, which are activated, can be adapted such that the distance will substantially correspond to the distance a between the hooks. Also a single radiating light source located directly at the separation point between two hooks is imaginable.

The light chaser bar preferably comprises a transparent protective cover, especially a cover made of silicone, e.g. a silicone tube. The light bar is thus sufficiently protected against moisture and dirt. This kind of light bar is also easy to clean, a property which is extremely important in the food producing sphere for hygienic reasons.

Figure 15:
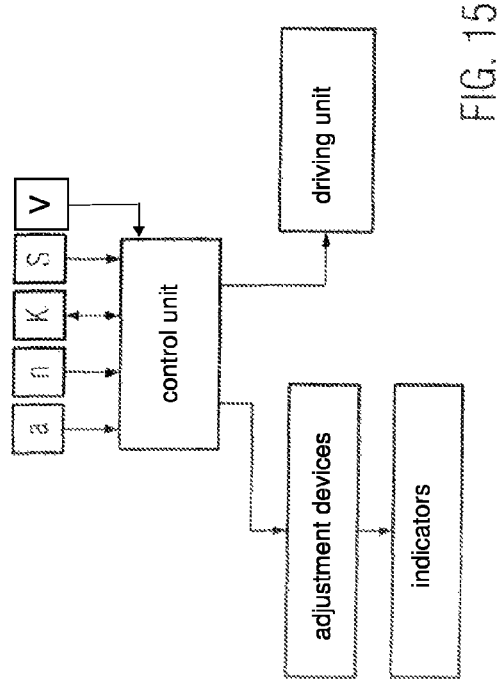
FIG. 15 shows schematically a block diagram for controlling the adjustment device.

As can be seen from FIG. 15, the number n of suspension hooks per group can be inputted in the control unit 16. Also the distance "a" between the hooks can be inputted in the control unit. In addition, the control unit 16 is also connected to the drive, i.e. e.g. the motor for the circulating driving unit 5, and controls the drive and the light source adjustment devices such that the lights of the light chaser bar can move in synchronism with the suspension hooks 2.

Furthermore, the control unit 16 may also be connected to components K of the production line, which are arranged upstream of the suspension apparatus, e.g. to a stuffing machine as well as to respective conveyor means.

For determining the position of the hooks, e.g. of the first hook of a group, at a specific moment in time, the control unit 16 may also be connected to a sensor S (arranged e.g. on the suspension apparatus) and may include e.g. a counter for counting the hooks or the hook positions via the parameters a, n and the speed of the conveyor means.

Alternatively, the control unit may receive these signals also from the stuffing machine for determining the above-mentioned hook positions. When the machine is switched on, a reference run (i.e. the hooks are moved over a reference distance via a drive motor so as to determine the hook position) is carried out, and the first hook is moved to the transfer position. This hook takes up the first sausage or sausage chain. The control unit receives from the stuffing machine a signal indicating that the first sausage is being transferred at the transfer station 9. Simultaneously, the LED at this position is assigned to this first hook. Via the parameters n, a and the conveying speed of the hooks, e.g. the respective hook positions as well as the beginning and the end of the group can be determined, and also corresponding spatially associated light sources can be determined. As soon as the hook is advanced by one position, e.g. the condition of all LEDs is advanced by one hook distance in the conveying direction as a register.

Irrespectively of a detail solution, it is only important that the control unit knows the current hook position of at least the beginning and/or the end of a group and associates with these positions corresponding light sources or LEDs which are to be activated.

Figure 2A:
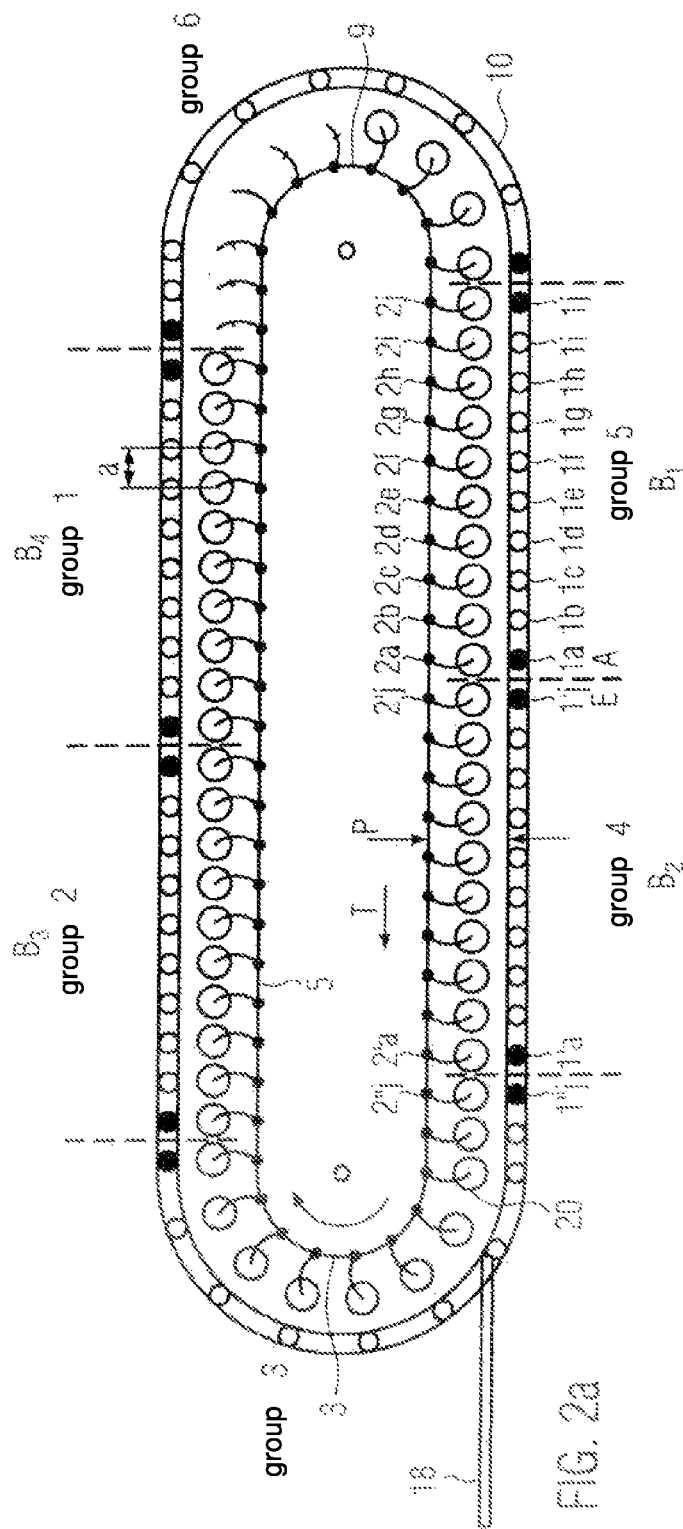
FIG. 2a shows in a highly schematic representation a top view of a first operating variant of the first embodiment at a first moment in time.

As has already been described above, the method according to the present disclosure is so conceived that, at the transfer position 9, a sausage loop, in particular a sausage chain, is taken up by the hook 2 and conveyed in the conveying direction T. In the case of this embodiment, the beginning of the group is indicated by a radiating LED. In FIG. 2a, the first group has already been conveyed into the right front area of the suspension apparatus 100. In this representation, a group comprises e.g. 10 sausage loops or chains, which are suspended from a corresponding number of 10 hooks 2a-2j. The n hooks 2a-2j have spatially associated therewith n corresponding indicators 1a-1j at a specific moment in time. As shown in FIG. 2a, the respective radiating indicator is the indicator which is here spatially associated with the first hook 2a and the last hook 2e or, in this case, arranged in opposed upwardly displaced relationship therewith. In FIG. 2a, the light bar is, for reasons of representation, shown such that the light sources face upwards. The operator would then look onto the hooks from above. Likewise, the light source may, however, be arranged such that it is arranged laterally in such a way that the operator will see the light sources when he looks at the suspension apparatus 100 from the side (looking e.g. at FIG. 1).

The radiating light sources 1a and 1j identify the beginning and the end of group 5. Also in the case of the leading group 4, the light sources 1'a and 1'j identifying the beginning and the end of group 4 radiate. A corresponding indication exists here also for groups 3, 2 and 1, by way of example. The operator knows that he has to cut through the sausage chain e.g. between the respective radiating indicators 1'j and 1a, 1"j and 1'a, etc., and will easily be able to find this location. The individual light sources are activated by the control unit 16 such that the indication moves in synchronism with the movement of the hooks.

FIG. 2b shows the device depicted in FIG. 2a at a later moment in time. As can be seen, group 1 has here already moved on in the conveying direction T, i.e. the hooks 2a-2j have been advanced together with the driving unit 5 in the conveying direction T. The light bar 10 has been activated such that, whenever the hook 2a, which represents the beginning, moves, a light source 1 spatially associated with said hook 2a will radiate. The light sources spatially associated with the hooks 2b-2i, which are located between the initial and the final hook, always remain switched off. This means that, whenever a hook, which represents a beginning or an end of a group, passes a light source, the latter will light up. This applies analogously also to the other groups. It would also be possible to indicate only the end or only the beginning. The operator then knows that he has to carry out the cut either upstream of the end or downstream of the beginning, when seen in the conveying direction. Also an inverse mode of representation is possible, in which the light sources indicating the beginning or the end do not radiate, whereas the other light sources radiate. When p≠0, i.e. when the light bar extends in spaced relationship with the driving unit 5, the distance between the activated light sources corresponding to a respective hook is larger in curves, as can be seen from FIGS. 2a and 2b, i.e. a larger distance between the successively activated light sources is chosen in this area. To make things easier, light sources located on the light bar between the light sources shown in FIGS. 2a and 2b are not shown. In the curve areas, an exact indication of the group beginning and/or of the group end is primarily necessary for manually separating the individual sausage groups.

The embodiment shown is only one example, arbitrary other light scenarios are possible as long as the indication allows the respective group beginning and/or group end of the sausages travelling on the hooks to be discerned.

If the sausages are not dealt with in the form of chains, but in the form of sausages suspended in the way described e.g. in connection with FIGS. 4b and c, this indication also serves to correctly insert the smoke bar. The operator then knows e.g. that he has to insert the smoke bar between the indicators 1'j and 1a and remove it after the indicator 1j. By lifting and lateral swivelling, the sausage chains can then be removed from the hooks laterally such that the smoke bar will not collide with the light chaser bar 10. If the light chaser bar is arranged on the front and on the back, work can also be done on the back of the suspension apparatus. For example, cutting may be carried out on the front and removal on the back.

Likewise, the light chaser bar may be configured such that multi-colored light sources are used, e.g. multi-colored LED strips, so that groups can be indicated separately on the front and on the back, one operator cutting through and/or removing groups of a first color on the front, whereas the other operator on the back cuts through and/or removes groups of a second color.

In the figures, sausages 20 are no longer shown in the last section preceding the section in which the hooks return to the transfer position, since the sausages have already been removed in this area. The sausages should be removed as long as they still travel on the straight conveying path.

An indication of a sausage group beginning and/or sausage group end in an area after the last removal region (e.g. B4) is therefore not necessary. In group 1 shown in FIG. 2b, the sausages have already been removed from the hooks. It is therefore not necessary that the light sources between hook group 1 and hook group 6 radiate.

Figure 3B:
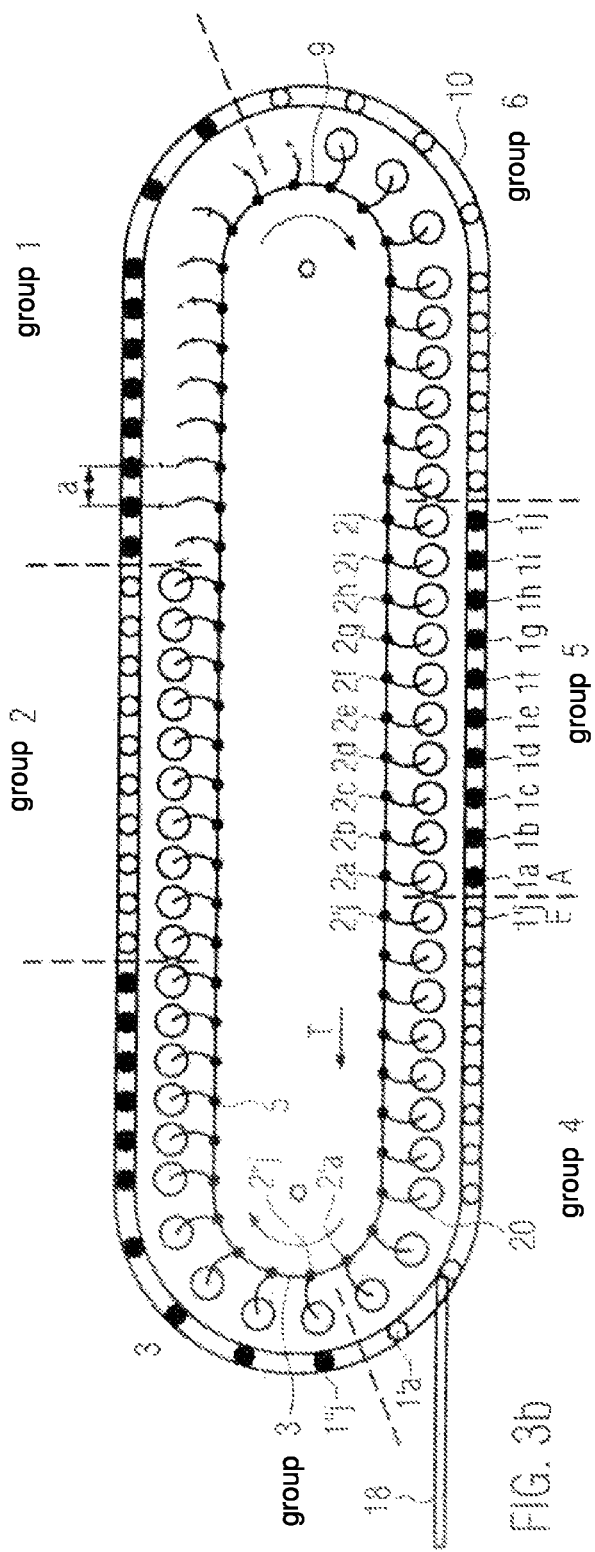
FIG. 3b shows the apparatus according to FIG. 3a at a second moment in time.

FIGS. 3a and 3b correspond to an embodiment corresponding to the first embodiment shown in connection with FIG. 1-2b, with the exception that the light sources are here controlled in a different manner. Whereas according to the first variant, which has been described in connection with FIGS. 2a and 2b, the light sources were switched between a first state corresponding to a group beginning A and/or a group end E of the suspension hooks and a second state, which does not correspond to any beginning or end of a group, (the first state may here be ON or OFF and the second state is then the respective other state), the new variant is so conceived that switching takes place between a first state corresponding to suspension hooks (2a-2j) of a first group and a second state corresponding to the suspension hooks of a subsequent second group. As can be seen in FIG. 3a, the taken-up hooks of group 5 have already been conveyed into the front area of the suspension apparatus 100.

The control unit 16 has supplied thereto a signal indicating when the first hook 1a of a group is taken up by the suspension hook 20, whereupon it activates the indicators 1, here the light chaser bar, accordingly.

The light sources spatially associated with the hooks 2a-2j do not radiate. This means that group 5 remains unlighted, whereas the light sources 1' a-1'j spatially associated with the hooks 2'a-2'j radiate. The indicator elements for the hooks of group 3 do, in turn, not radiate. This means that the indicators of respective successive groups exhibit different states. Successive groups may also be indicated by different colors. As can clearly be seen from FIG. 3b, the light chaser bar is controlled by the control unit 16 such that the indication moves synchronously together with the movement of the reception hooks. As shown in FIG. 3b, the group of hooks 2a-2j as well as the indication 1a-1j moved here further in the conveying direction. This means that the indicators on the light chaser bar will light up whenever hooks of a specific group, here e.g. of groups 5, 3 and 1, pass the indicator in question. The operator can thus easily discern where a group end E and a group beginning A is, since the respective indicators 1'j, 1a exhibit different states. Hence, the operator will here be able to cut through the sausage strand and/or remove the group by means of a smoke bar 18, as has been described above in connection with FIG. 2a, b.

In FIG. 3a, the sausages of group 6 have already been removed from the hooks. In a next run, the hooks of group 6 are loaded with sausages only from the transfer position 9 onwards, so that the light sources will again radiate from position 9 onwards.

The fact that the indication moves together with the hook movement provides the advantage that the operator need not cut through or remove the sausage strand at a specific moment in time.

FIG. 5 shows a second embodiment of the present disclosure. FIG. 5 corresponds to the embodiment shown in FIGS. 1 to 3, without using, however, a light chaser bar. Instead, indicators 1 are used, which are each secured to a respective suspension hook 2. The indicators 1 can thus be moved together with the hooks 2 in the conveying direction T. The indicators are configured such that their position can be changed mechanically and/or their color can change so as to indicate the group beginning and/or the group end. The variant shown in FIG. 5 corresponds in this respect to the variant shown in FIG. 2a, in which the indicator, here the indicator at the beginning and at the end, exhibits a state which is different from that of the indicators 1b-1i between the outer indicators. The operator is thus able to optically discern the group end E and/or the group beginning A and to cut through e.g. the sausage chain at the right location, as has been described above. To this end, the apparatus includes an adjustment device 3, which is connected to the control unit 16 and which changes, i.e. adjusts, the various indicators 1 associated with the respective hook 2. In FIG. 5, by way of example, a part of the indicator at the group beginning and at the group end is extended. Examples for this kind of indicators will be explained herein below. Upstream of the transfer position 9, a neutralizer 4 may additionally be provided. Also this neutralizer 4 is connected to the control unit 16, and it is used for moving all the incoming indicators to identical positions.

FIG. 6 corresponds to the embodiment shown in FIG. 5, the indicators of successive groups exhibiting here different states, as has been explained in connection with FIGS. 3a and 3b.

In the following, indicators will be shown, which can be used in connection with the embodiments depicted in FIGS. 5 and 6.

Figure 8:
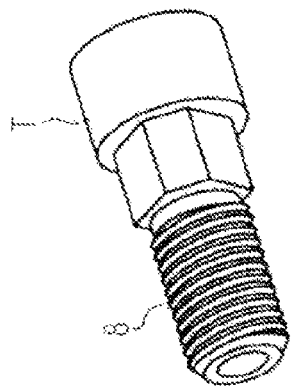
FIG. 8 shows a locking bolt in a perspective view.
Figure 9B:
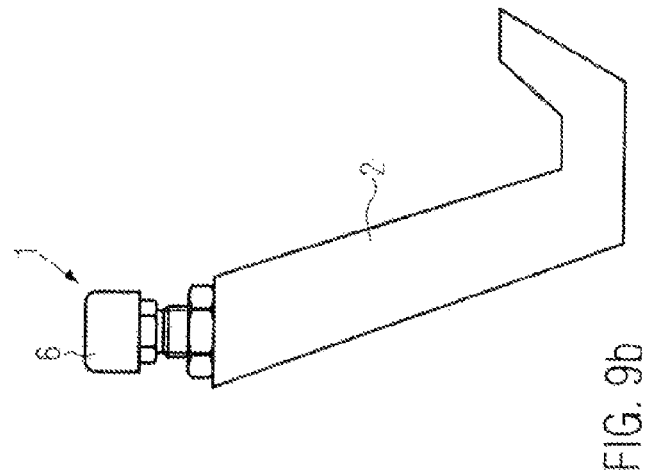
FIG. 9b shows the hook according to FIG. 9a with the locking bolt occupying an upper position.
Figure 9A:
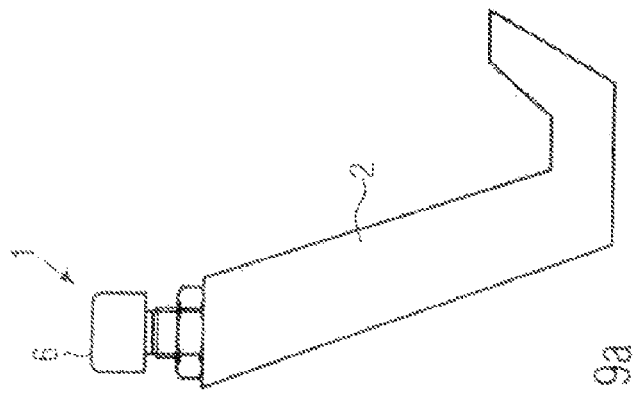
FIG. 9a shows in a highly schematic representation a front view of a hook with a locking bolt occupying a lower position.

As shown in FIGS. 7 and 8, e.g. a locking bolt can be used as an indicator 1. As is also schematically shown in FIG. 9a, the locking bolt is arranged in the upper area of the suspension hook 2 in an appropriate hole. By pressing the operating button 6, an indexing pin 11 can be extended and retracted (PUSH-PUSH locking mechanism). In the case of the locking bolt (e.g. locking bolt GN514 of the firm of Ganter), the indexing pin is moved with the aid of a spring via a so-called cardioid mechanism. FIG. 7a shows a lower position of the locking bolt. When the button 6 is pressed, as shown in FIG. 7b, the upper end of the bolt moves upwards to an elevated position. By pressing the button 6 once more, the bolt can be returned to its lower position (FIG. 7d, FIG. 7a). The operator can see the difference between a lower position, which is shown in FIG. 9a, and an upper position, which is shown in FIG. 9b. To this end, the adjustment device 3 is configured such that a mechanism is provided, which applies pressure to the bottom from above, e.g. via a lifting solenoid, which is controlled by the control unit 16 and which, according to the intended states described in connection with FIGS. 5 and 6, moves the bolt to a respective position. By means of a flag in the control unit 16, the state of the bolt is stored for each hook 2.

According to another possibility, which is shown in FIG. 10a-11b, the indicator may e.g. be configured as an element that is rotatable about a shaft 15 connected to the hook 2. By rotating the element the indicator can be transferred to different states.

Figure 10B:
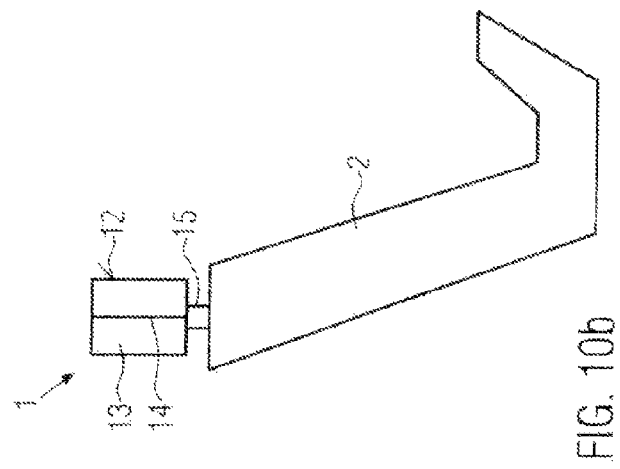
FIG. 10b shows the hook according to FIG. 10a having the tip or edge of the prism rotated to the front.
Figure 11B:
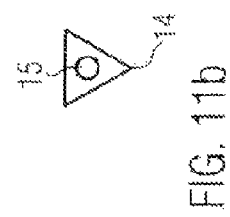
FIG. 11b shows a top view of the rotated prism according to FIG. 10b.
Figure 10A:
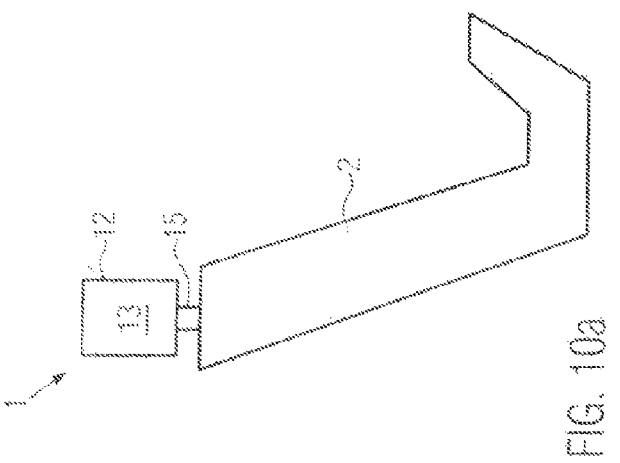
FIG. 10a shows in a highly schematic representation a front view of a suspension hook with a three-sided prism with its side face facing forwards.
Figure 11A:
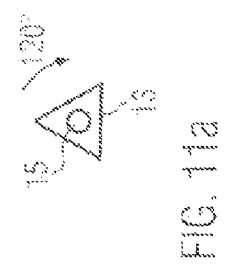
Figure 12B:
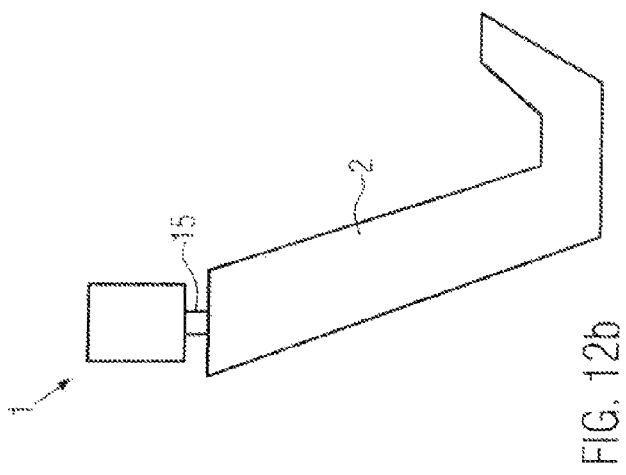
FIG. 12b shows the suspension hook according to FIG. 12a with the indicator occupying a rotated position.

The rotatable body is here a regular isosceles three-sided prism, a side face 13 of the prism being visible in a first state, as shown in FIG. 10a. If, as shown in FIG. 11a, the prism is rotated by e.g. 120°, it is no longer the face 13 but the front edge 14 that will be visible, as can be seen in FIGS. 10b and 11b. Hence, the operator will easily discern different states of the modifiable indicator. The face 13 may additionally be colored.

Figure 13B:
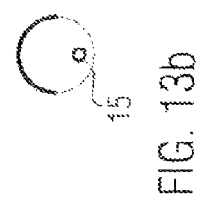
FIG. 13b shows a top view of the indicator according to FIG. 12b, rotated by 180°.
Figure 12A:
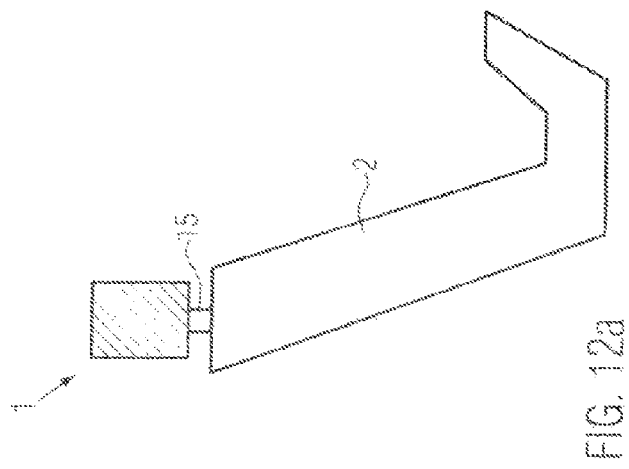
FIG. 12a shows in a highly schematic representation a front view of a suspension hook with an indicator occupying a first position.
Figure 13A:
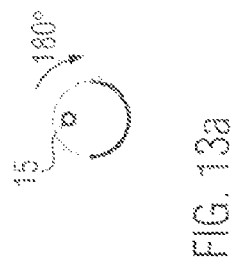

As shown in connection with FIG. 12a-13b, e.g. also a component that is supported such that it is eccentrically rotatable about a shaft 15 may be used as an indicator 1. The eccentric has, as can especially be seen from FIGS. 13 and 13b, different colors on its front and back. By rotating the eccentric by 180°, a change of states can be discerned when the front of the hooks is viewed. Whereas in FIG. 3a the front view of the eccentric is dark, the front view of the eccentric shown in FIG. 13b is bright.

Also in this case it is the adjustment device 3 that can accomplish the rotary motion of the eccentric in accordance with the state to be indicated for a hook. The rotary motion may e.g. be effected via a component moving transversely to the conveying direction and pressing against the area of the eccentric remote from the shaft. Also the movement of the component may be realized by a lifting magnet. The adjustment device can thus change over between the two states shown in FIGS. 12a and 12b. The eccentric executes here a 180° rotary motion. In order to allow a reliable adjustment of the eccentrics, they are, prior to positioning through the adjustment device, moved to a neutral intermediate position by the neutralizer 4. This can be accomplished e.g. via an adequate guide means. The positioning of the eccentrics at their final position also depends on friction and on how they are supported.

The indicators shown in connection with FIGS. 9 to 13 are only exemplary. Many different variants of the adjustable components and of the adjustment devices are imaginable. The only essential aspect is that the position and/or color of an indicator can be changed via an adjustment device such that this change can easily be discerned by the operator.

Figure 14:
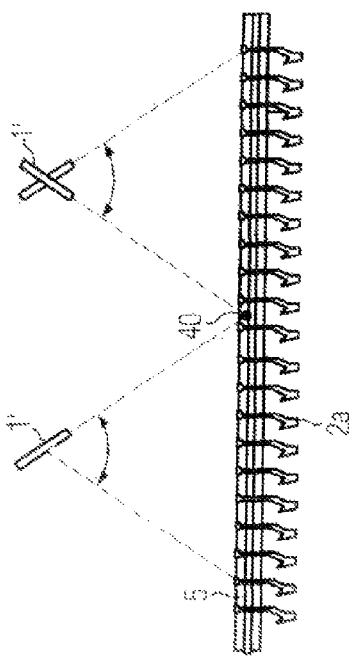
FIG. 14 shows in a highly schematic and perspective representation a third embodiment according to the present disclosure including a laser pointer as an indicator.

FIG. 14 shows a further embodiment of the present disclosure. The various successive groups are here marked on the suspension apparatus by at least one laser pointer. In the present embodiment, two laser pointers 1, 1' are shown. The two laser pointers 1, 1' are positioned above the suspension apparatus and are adjusted via an adjustment device—in the present case e.g. a servo motor which rotates the laser pointer about an axis such that the indicator spot 40 will move synchronously together with the movement of the hooks. The adjustment device may here be a motor, which is also connected to the control unit 16. The indicator spot 40 points to a point at the group end and/or at the group beginning, i.e. between two groups. In the middle, the indicator spot 40 is transferred from the first laser 1 to the second laser 1'. An excessively oblique position is avoided in this way. The two laser pointers 1, 1' must be adjusted to two reference positions by means of a teaching function and, during operation, the control unit 16 informs them continuously of the position of the group end and/or the group beginning. The drive continuously adjusts the angle of the lasers such that the two light beams will always point to the group end and/or the group beginning. This solution is advantageous insofar as collisions during removal of the portions from the hooks will be avoided.

The invention claimed is:

1. A suspension apparatus for suspending a plurality of sausages, comprising a plurality of circulating suspension hooks, the suspension apparatus being configured such that it is able to accommodate a plurality of groups of sausages (20), the respective sausages being suspended from n suspension hooks (n∈IN), at least one variable indicator capable of indicating a group end (E) and/or a group beginning (A), and an adjustment device through which a state of the indicator can be changed:
   a) between a first state corresponding to at least one of a group beginning (A) or a group end (E) of the suspension hooks; and
   a second state which does not correspond to either a beginning or an end of a group; or
   b) between a first state indicating the suspension hooks of a first group and a second state indicating the suspension hooks of a subsequent second group.

2. The suspension apparatus according to claim 1, wherein the distances (a) between the suspension hooks are constant.

3. The suspension apparatus according to claim 2, and wherein the suspension hooks are adapted to be driven by a circulating driving element.

4. The suspension apparatus according to claim 1, and a control unit into which the specific number of suspension hooks per group can be inputted, the control unit controlling the adjustment device.

5. A suspension apparatus for suspending a plurality of sausages, comprising a plurality of circulating suspension hooks, the suspension apparatus being configured such that it is able to accommodate a plurality of groups of sausages (20), the respective sausages being suspended from n suspension hooks (n∈IN), at least one variable indicator capable of indicating a group end (E) and/or a group beginning (A), wherein each indicator is configured as a component which is arranged on the hook and which is variable as regards its position and/or color.

6. The suspension apparatus according to claim 1, and wherein the indicated group end and/or group beginning moves in synchronism with the movement of the suspension hooks in the conveying direction.

7. The suspension apparatus according to claim 1, wherein the plurality of sausages comprises sausage chains.

8. A suspension apparatus for suspending a plurality of sausages, comprising a plurality of circulating suspension hooks, the suspension apparatus being configured such that it is able to accommodate a plurality of groups of sausages (20), the respective sausages being suspended from n suspension hooks (n∈IN), at least one variable indicator capable of indicating a group end (E) and/or a group beginning (A), and at least one movable laser pointer pointing to the group end (E) and/or to the group beginning (A).

9. The suspension apparatus according to claim 8, and comprising at least two movable laser pointers.

10. The suspension apparatus according to claim 8, wherein each movable laser pointer is pivotable.

11. A suspension apparatus for suspending a plurality of sausages, comprising a plurality of circulating suspension hooks, the suspension apparatus being configured such that it is able to accommodate a plurality of groups of sausages (20), the respective sausages being suspended from n suspension hooks (n ⊂ IN), at least one variable indicator capable of indicating a group end (E) and/or a group beginning (A), and wherein the indicator comprises a light source.

12. The suspension apparatus according to claim 11, and wherein a plurality of light sources is arranged on a light bar, which is arranged at least partially at the circulation path of the hooks.

13. The suspension apparatus according to claim 12, wherein the light bar includes a transparent protective cover.

14. The suspension apparatus according to claim 13, wherein the protective cover comprises a cover made of silicone.

15. The suspension apparatus according to claim 12, wherein the light bar comprises multi-colored light sources.

16. The suspension apparatus according to claim 15, wherein the light sources comprise LEDs.

17. The suspension apparatus according to claim 12, wherein the plurality of light sources is a plurality of LEDs.

18. The suspension apparatus according to claim 11, and a control unit controls the adjustment device such that the group beginning and/or the group end is indicated by one or a plurality of light sources lighting up in the conveying direction of the suspension hooks together with the movement of the suspension hooks.

19. The suspension apparatus according to claim 18, wherein the light sources are LEDS.

20. The suspension apparatus according to claim 11, wherein the light source comprises an LED.

21. A method of suspending a plurality of sausages including:
   taking the sausages up on suspension hooks of a suspension apparatus comprising a plurality of circulating suspension hooks, the suspension apparatus accommodating a plurality of groups of sausages (20), the respective sausages being suspended from n suspension hooks (n ∈IN), and at least one variable indicator capable of indicating a group end (E) and/or a group beginning (A);
   conveying the sausages in a conveying direction suspended from the suspension hooks, at least one of the group end (E) or the group beginning (A) of a sausage group being indicated via one of the at least one variable indicators, and wherein the indication of at least one of the group end or the group beginning moves synchronously with the movement of the suspension hooks in the conveying direction, and the at least one of the group end or the group beginning is indicated by one or a plurality of light sources arranged on a light bar and operated in the conveying direction together with the movement of the hooks.

22. The method according to claim 21, wherein the plurality of sausages comprise sausage chains.

23. The method according to claim 22, and wherein the sausage chain suspended from the suspension hooks is cut through at least one of upstream of the indicated group end (E) or downstream of the indicated beginning (A) of the subsequent group, when seen in the conveying direction.

24. The method of claim 23, and wherein a smoke bar for removing the subsequent group is inserted at the point indicated.

25. The method according to claim 22, and wherein a smoke bar for removing the subsequent group is inserted at the point indicated.

26. The method according to claim 21, wherein the plurality of light sources comprise LEDs.

* * * * *